(12) United States Patent
Wiese-Martin et al.

(10) Patent No.: US 8,418,400 B2
(45) Date of Patent: Apr. 16, 2013

(54) LIQUID HERBICIDE APPLICATOR

(76) Inventors: Cynthia M. Wiese-Martin, Devils Lake, ND (US); Alan G. Martin, Devils Lake, ND (US)

(*) Notice: Subject to any disclaimer, the term of this patent is extended or adjusted under 35 U.S.C. 154(b) by 126 days.

(21) Appl. No.: 12/908,175

(22) Filed: Oct. 20, 2010

(65) Prior Publication Data

US 2012/0096765 A1 Apr. 26, 2012

(51) Int. Cl.
*A01M 21/04* (2006.01)
(52) U.S. Cl.
USPC ............................................................. 47/1.5
(58) Field of Classification Search ............ 47/1.5, 47/48.5, 57.5; 251/82, 83; 111/118, 7.1–7.4, 111/127; 401/170; *A01M 21/04*
See application file for complete search history.

(56) References Cited

U.S. PATENT DOCUMENTS

| | | | | |
|---|---|---|---|---|
| 1,606,860 A * | 11/1926 | Winn | | 401/148 |
| 1,865,914 A * | 7/1932 | Jaden | | 47/1.5 |
| 2,659,918 A * | 11/1953 | Stoner | | 401/192 |
| 2,817,189 A * | 12/1957 | Esmay | | 47/1.7 |
| 2,821,944 A * | 2/1958 | Blake | | 111/7.3 |
| 2,934,859 A * | 5/1960 | Little | | 47/57.5 |
| 2,974,445 A * | 3/1961 | Vann | | 47/57.5 |
| 2,979,757 A * | 4/1961 | Smith | | 401/206 |
| 3,035,370 A * | 5/1962 | Carson | | 47/57.5 |
| 3,077,166 A * | 2/1963 | Delp | | 111/7.3 |
| 3,346,194 A * | 10/1967 | Enblom | | 239/333 |
| 4,027,986 A | 6/1977 | Patrick | | |
| 4,135,274 A | 1/1979 | Freeman | | |
| 4,403,881 A | 9/1983 | Keeton | | |
| 4,597,219 A | 7/1986 | Kropf | | |
| 4,882,874 A * | 11/1989 | Paulson et al. | | 47/1.5 |
| 4,894,948 A | 1/1990 | Eubanks | | |
| 5,216,833 A * | 6/1993 | Longer | | 47/1.5 |
| 5,555,673 A * | 9/1996 | Smith | | 47/1.5 |
| 6,014,836 A | 1/2000 | Chester | | |
| 6,634,435 B2 * | 10/2003 | Saeger | | 172/21 |
| 2008/0092440 A1 * | 4/2008 | Johnson | | 47/48.5 |
| 2011/0030272 A1 * | 2/2011 | Rose | | 47/1.5 |

* cited by examiner

*Primary Examiner* — Son T Nguyen
*Assistant Examiner* — Shadi Baniani
(74) *Attorney, Agent, or Firm* — Dale J. Ream

(57) ABSTRACT

A liquid herbicide applicator includes a length adjustable handle member and a reservoir removably coupled to the handle member, the reservoir defining an inlet for receiving a liquid and an outlet from which to dispense liquid. The applicator includes a valve assembly coupled to the reservoir outlet operative between an open configuration that allows the liquid to flow through the outlet and a closed configuration that prevents the liquid from flowing through the outlet. The valve assembly is biased toward the closed configuration. A dispenser assembly having a cap portion is operatively coupled to the valve assembly and includes an application portion connected to the cap portion, the cap portion being selectively movable closer to the valve assembly so as to urge the valve assembly to the open configuration and away from the valve assembly so to allow the valve assembly to return to the closed configuration.

5 Claims, 9 Drawing Sheets

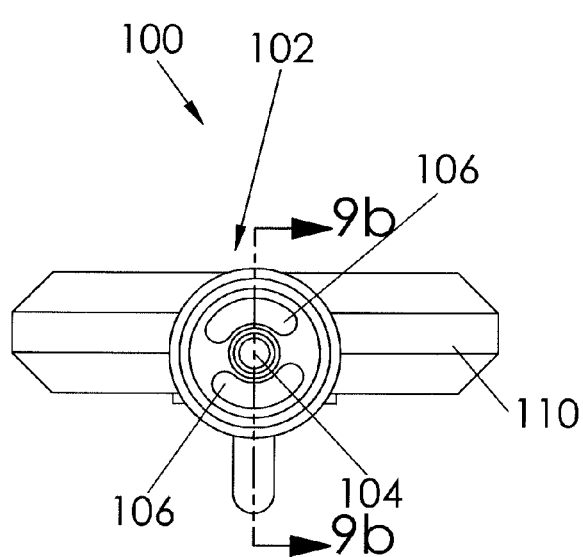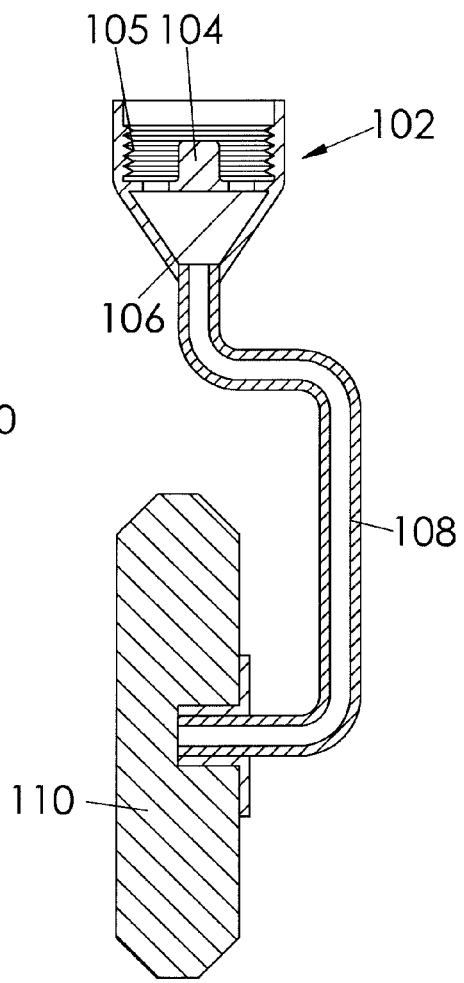
Fig. 9a
Fig. 9b

LIQUID HERBICIDE APPLICATOR

BACKGROUND OF THE INVENTION

This invention relates generally to weed control devices and, more particularly, to a liquid herbicide applicator for selectively applying herbicide to weeds contacted by an applicator pad.

It is often times desirable to apply a herbicidal weed killer directly to weeds while avoiding contacting with grass, flowers, or other plants. In other words, traditional spraying of a herbicide may not be possible because it would risk damage to surrounding plant life. If, however, herbicide is applied directly to the weeds, they may be controlled without negative consequences to surrounding plant life. A major problem with applying a herbicidal liquid to the weeds individually is that it may require a user to repeatedly bend over or to kneel to his or knees or even to crawl across the lawn.

Various devices have been proposed in the art for applying weed killing liquid directly to weeds. Although assumably effective for their intended purposes, the existing devices and proposals do not provide a liquid herbicide applicator that is easily length adjustable for use by persons of various heights or that sometimes may be using a wheelchair, that includes an easily refillable herbicide reservoir, and that includes removable and replaceable applicator heads.

Therefore, it would be desirable to have an herbicide applicator that satisfies all of the limitations of the existing and previous proposals.

SUMMARY OF THE INVENTION

A liquid herbicide applicator according to the present invention includes a length adjustable handle member and a reservoir removably coupled to the handle member, the reservoir defining an inlet for receiving a liquid and an outlet from which to dispense liquid. The applicator includes a valve assembly coupled to the reservoir outlet operative between an open configuration that allows the liquid to flow through the outlet and a closed configuration that prevents the liquid from flowing through the outlet. The valve assembly is biased toward the closed configuration. A dispenser assembly having a cap portion is operatively coupled to the valve assembly and includes an application portion connected to the cap portion, the cap portion being selectively movable closer to the valve assembly so as to urge the valve assembly to the open configuration and away from the valve assembly so to allow the valve assembly to return to the closed configuration.

Therefore, a general object of this invention is to provide a liquid herbicide applicator for applying a liquid herbicide directly on a selected weed or weeds.

Another object of this invention is to provide a herbicide applicator, as aforesaid, that includes an easily refillable reservoir.

Still another object of this invention is to provide a herbicide applicator, as aforesaid, that is length adjustable so that persons of various heights may use the device without bending, squatting, or getting on their knees.

Yet another object of this invention is to provide a herbicide applicator, as aforesaid, that includes removable and replaceable heads depending on the types of weeds, terrain, or user desired method of application.

A further object of this invention is to provide a herbicide applicator, as aforesaid, that is easy to use and economical to manufacture.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 5b is a sectional view taken along line 5b-5b of FIG. 5a;

FIG. 6b is a sectional view taken along line 6b-6b of FIG. 6a;

FIG. 9a is a top view of the second auxiliary dispenser assembly as in FIG. 8b; and FIG. 9b is a sectional view taken along line 9b-9b of FIG. 9a.

DESCRIPTION OF THE PREFERRED EMBODIMENT

Figure 1:
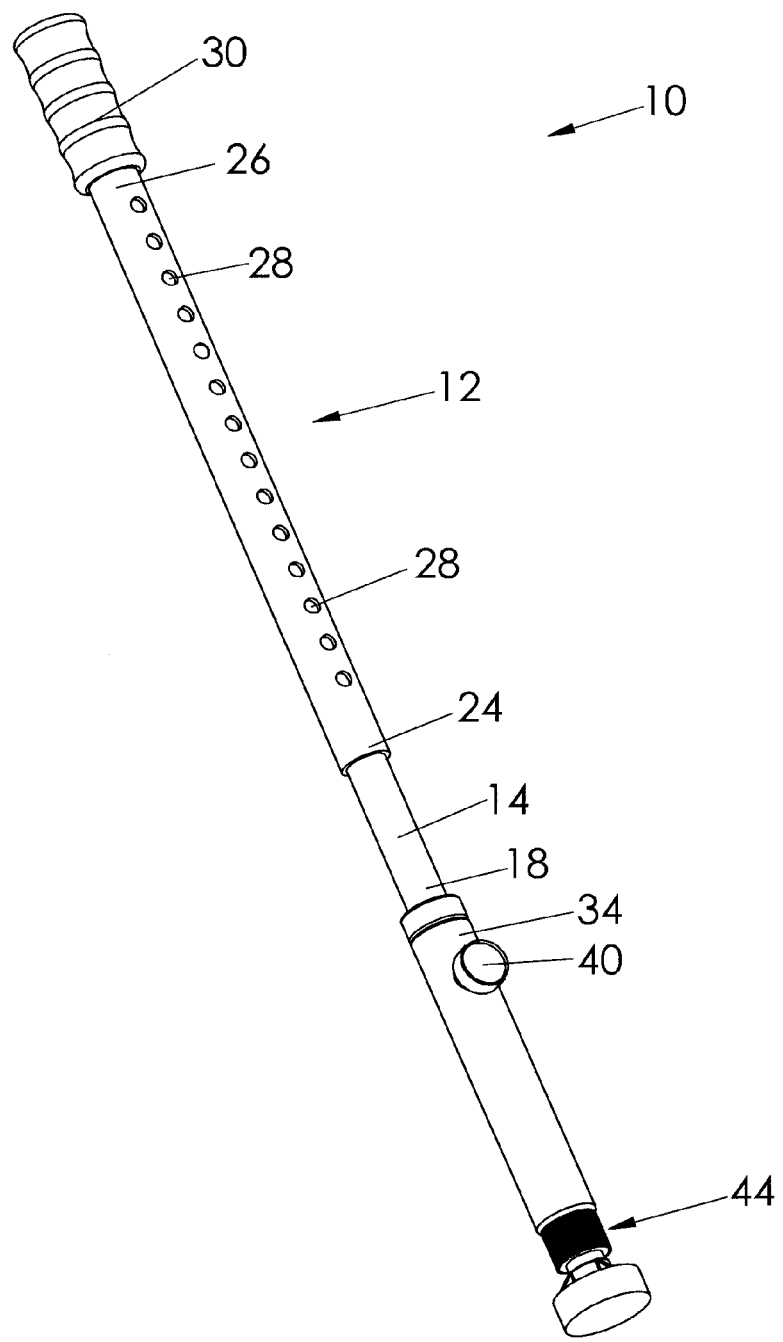
FIG. 1 is a perspective view of a liquid herbicide applicator according to a preferred embodiment of the present invention shown in an extended configuration.
Figure 2:
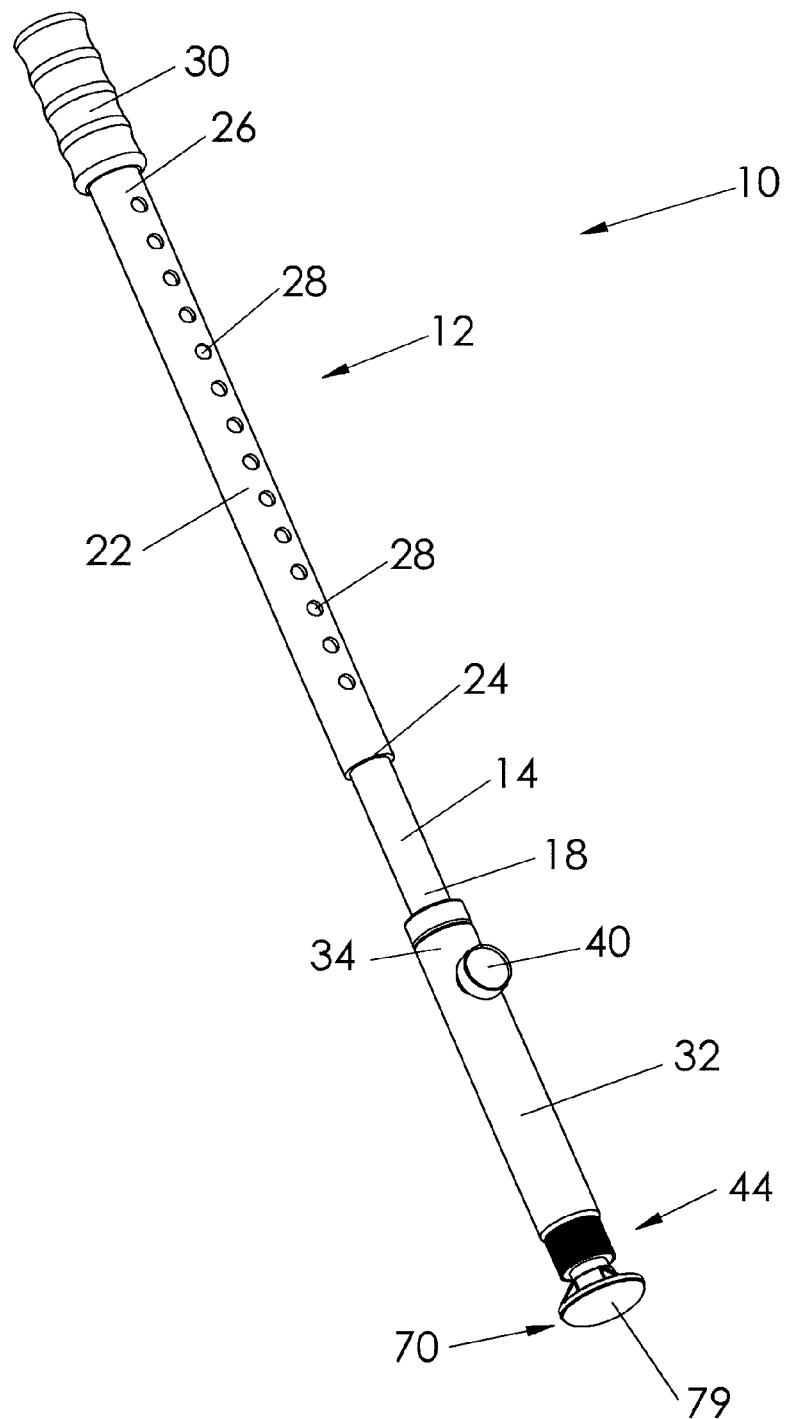
FIG. 2 is another perspective view of the applicator as in FIG. 1 shown in a retracted configuration.
Figure 3:
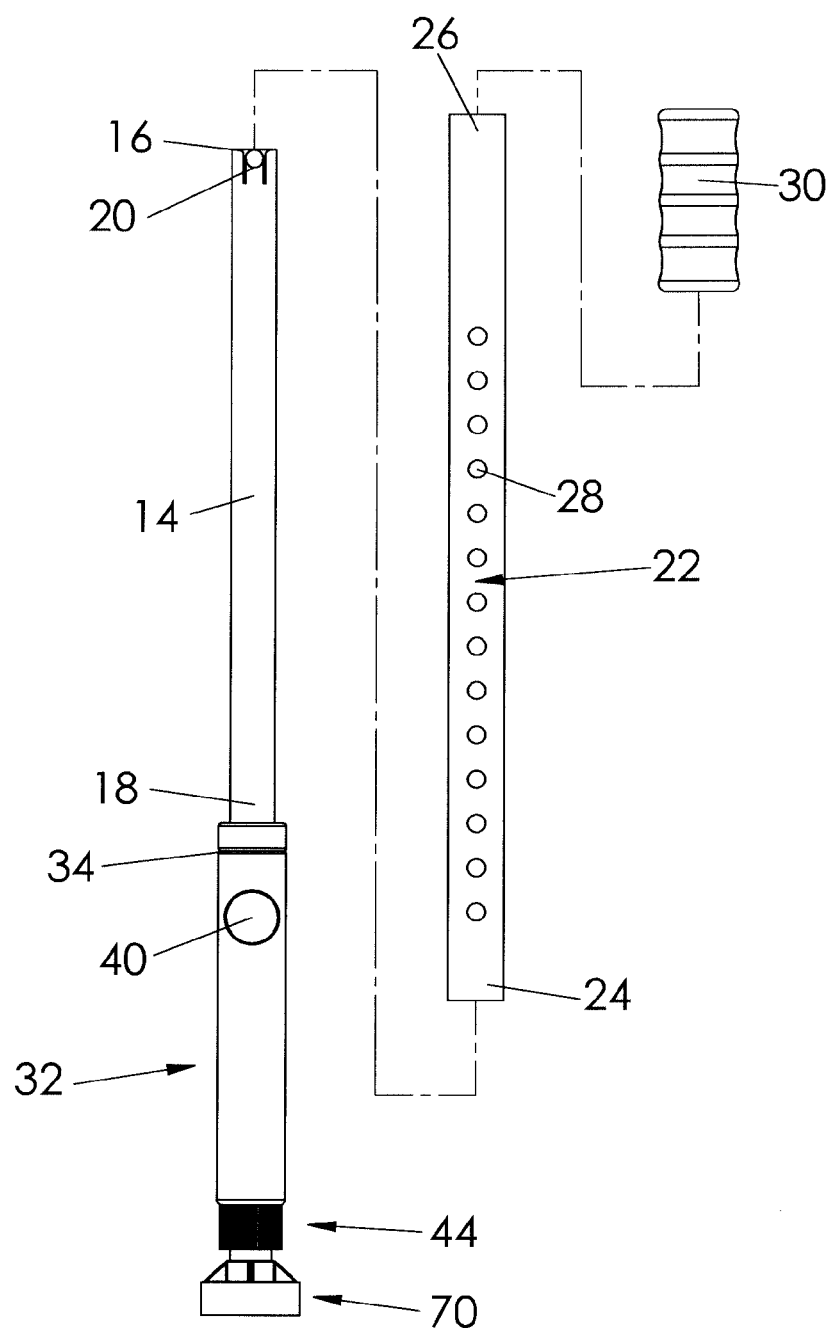
FIG. 3 is an exploded view of a length adjustable handle member of the applicator as in FIG. 1.

A liquid herbicide applicator according to the present invention will now be described with reference to FIGS. 1 to 9b of the accompanying drawings. The liquid herbicide applicator 10 includes a length adjustable handle member 12, a refillable reservoir 32, a valve assembly 44 for regulating liquid from the reservoir 32 to a dispenser assembly 70 from which it may be applied to a weed.

The length adjustable handle member 12 includes a first portion 14 having opposed upper 16 and lower 18 ends and includes a second portion 22 having opposed proximal 24 and distal 26 ends. The handle second portion 22 includes a configuration that is slidably movable relative to the handle first portion 14. Preferably, the first 14 and second 22 portions include tubular configurations and the handle second portion 22 has a diameter that is slightly larger than a diameter of the handle first portion 14 such that the handle first portion 14 is selectively receivable into the handle second portion 22. The handle first portion 14 may include a spring biased button 20 at the upper end 16 thereof. The button 20 is configured to extend outwardly from the handle first portion 14. The handle second portion 22 may define a plurality of apertures 28 spaced apart longitudinally between proximal 24 and distal 26 ends thereof, each aperture 28 having a configuration suitable to receive a button 20 therein. The spring loaded buttons 28 and plurality of apertures 28 provide a means for maintaining the extendable handle member 12 at a desired length configuration. It is understood that the spring loaded button may be a spring steel flange or other resilient component. The button 20 and apertures 28 may be collectively referred to herein as a locking mechanism.

A handle grip 30 may be coupled to the distal end 26 of the second portion 22 of the length adjustable handle member 12. Preferably, the handle grip 30 may be constructed of a rubber material that is both comfortable and secure for a person to hold onto. The handle grip 30 may also have an ergonomic configuration and have surface texture or relief features that make it easier to grip.

Figure 4:
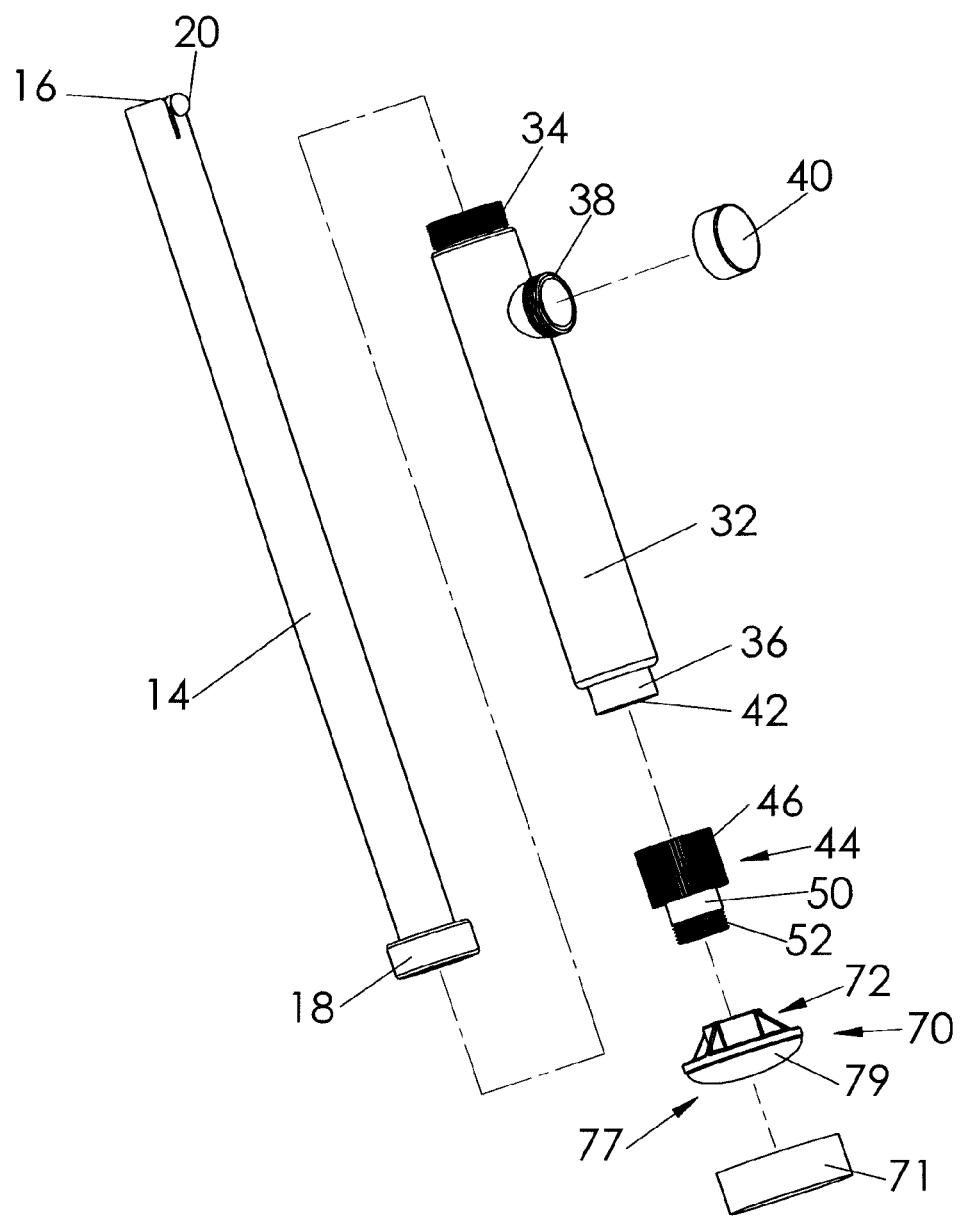
FIG. 4 is an exploded view of the reservoir, valve assembly, and dispenser assembly of the applicator as in FIG. 1.

The reservoir 32 includes an upper end 34 having a configuration complementary to the lower end 18 of the first portion 14 of the handle member 12 such that respective ends may be coupled together. Preferably, the reservoir upper end 34 is removably coupled to the handle member first portion lower end 18. More particularly, the handle member first portion lower end 18 may include an interiorly threaded end or coupling and the reservoir upper end 34 may include an exteriorly threaded end, as best shown in FIG. 4. Accordingly, the reservoir 32 may be quickly and easily attached or detached from the handle member 12. In other words, the applicator 10 may generally be used with or without the length adjustable handle 12.

Preferably, the reservoir 32 includes a generally tubular configuration that defines a hollow interior area. Further, the reservoir 32 defines an inlet 38 through which a liquid, such as a liquid herbicide, may be inserted into the interior area. A cap 40 may be removably coupled to the reservoir inlet 38. This configuration is useful so that the reservoir 32 may be refilled during use. A lower end 36 of the reservoir 32 defines an outlet 42 through which liquid from within the reservoir 32 may flow out of the interior area.

The valve assembly 44 includes an upper end 48 attached to the lower end 36 of the reservoir 32. Preferably, attachment of these ends may be by way of a friction fit, glued, or other permanent attachment means although a releasable mounting arrangement may also work, such as a threaded coupling. The valve assembly upper end 48 defines an opening in fluid communication with the reservoir outlet 42. An exterior surface of an attachment portion 46 of the valve assembly 44 may include a knurled edge or include various textures or relief features to enhance grip by a user (FIG. 4). The valve assembly 44 also includes a body portion 50 extending from the attachment portion 46 having a valve assembly lower end 52 that includes a threaded exterior surface 53 and that defines an opening. The body portion 50 defines a bore 54 extending between respective end openings, the bore 54 having more than one segment 56 and each segment having a unique inner diameter. The valve assembly lower end 52 may include a threaded exterior surface for attachment to the dispenser assembly 70 as will be described in more detail below.

Figure 5A:
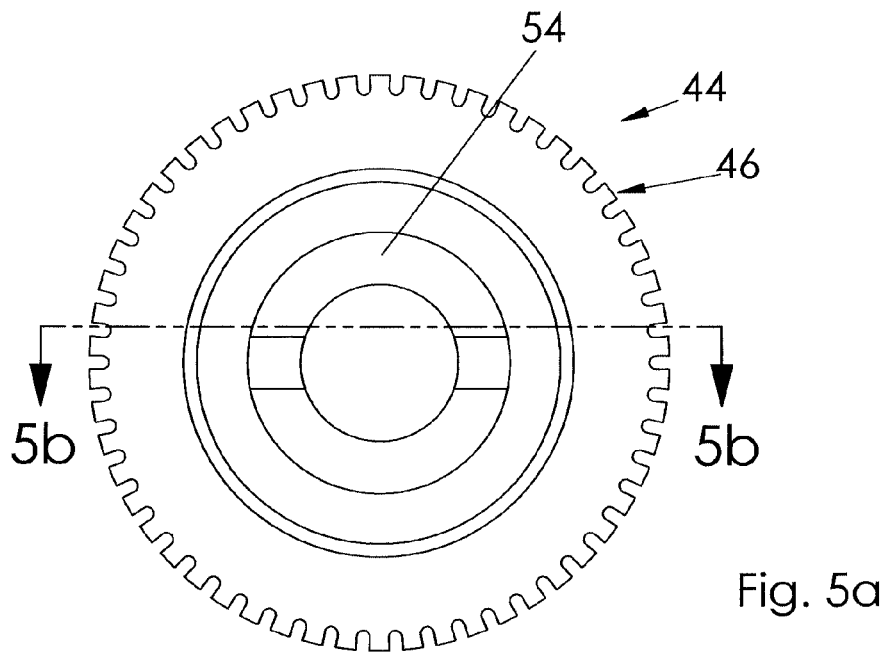
FIG. 5a is a top view of the valve assembly as in FIG. 4.
Figure 5B:
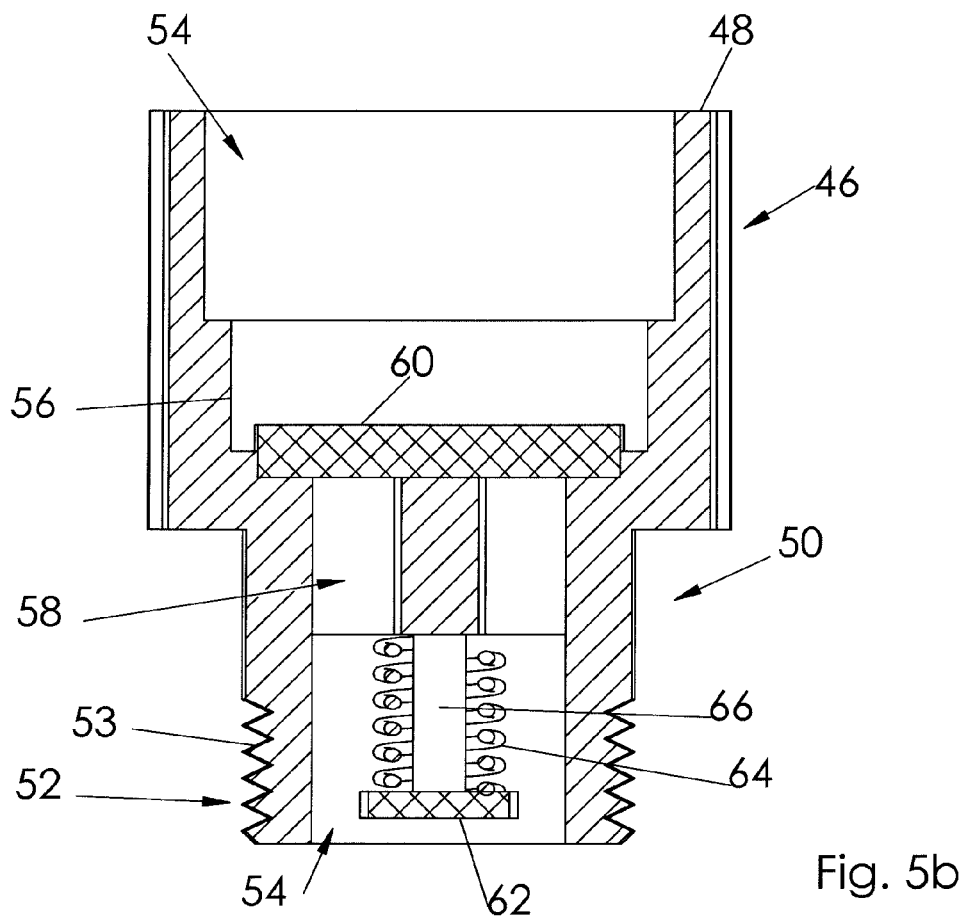

As best shown in FIG. 5b, a sealing mechanism 58 is positioned in the bore 54 that extends through the valve assembly body portion 50 between the valve assembly upper and lower openings, the sealing mechanism including a seal 60, an actuation plate 62, and a spring 64 such that liquid from the reservoir 32 is selectively blocked and not allowed to flow between the valve assembly openings. This position will be referred to as a "closed configuration." More particularly, the seal 60 is a plate having a configuration complementary to an inner diameter of a first segment 56 within the body portion bore 54, whereby to block fluid from flowing through that respective segment 56. It is understood that a bore segment upwardly adjacent to the one segment 56 (hereafter referred to as the "adjacent segment" or "another segment") has a diameter larger than that of the "first segment" such that liquid is allowed to flow through the bore 54 when the seal 60 is positioned in the adjacent segment. The actuation plate 62 is positioned within the bore 54 lowerly adjacent the seal 60 and a shaft 66 connects the actuation plate 62 to the seal 60. The spring 64 is mounted about the shaft 66 and is configured to bias the sealing mechanism 58 toward the sealed configuration. When a force is applied to the actuation plate 62, the sealing mechanism is urged upwardly such that the seal 60 is moved upwardly from the "first segment" into the "adjacent segment" and liquid may flow through the bore. This position will be referred to as an open configuration. When the force is removed from the actuation plate 62, the spring 64 causes the seal 60 to return to the closed configuration. Operation of the sealing mechanism will be described in greater detail later.

Figure 6A:
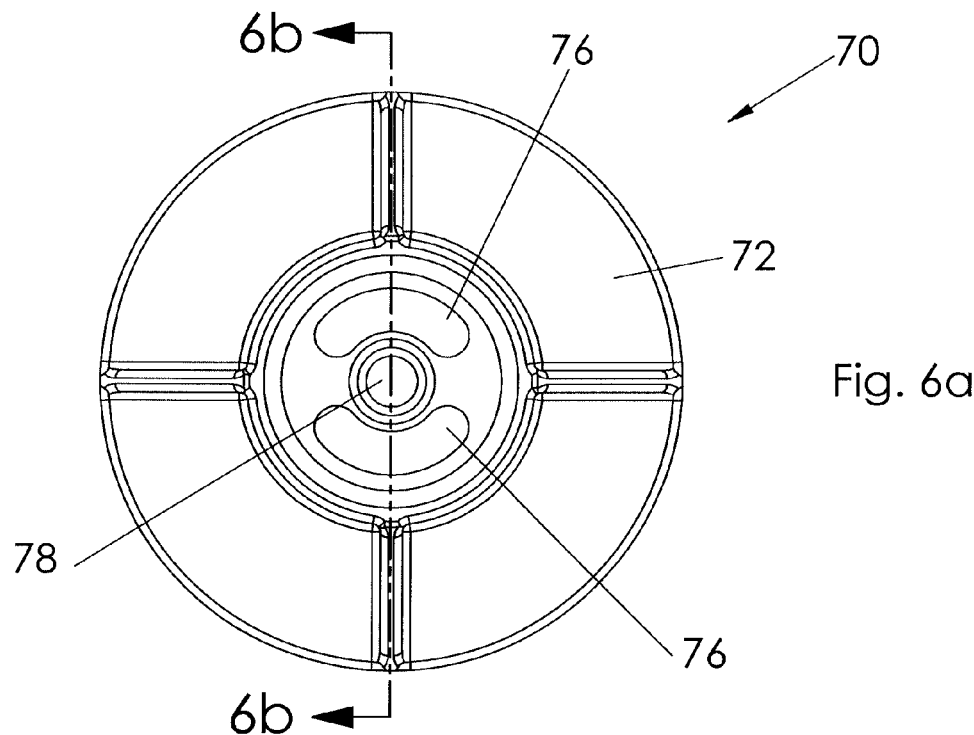
FIG. 6a is a top view of the dispenser assembly as in FIG. 4.
Figure 6B:
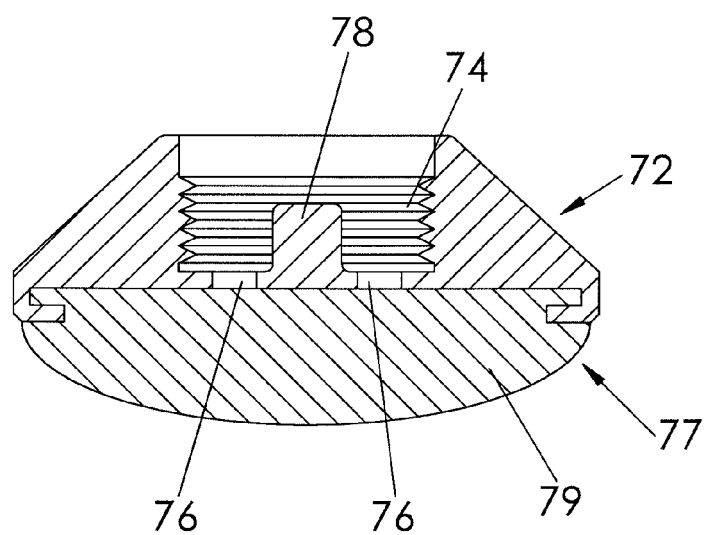

The dispenser assembly 70 according to one embodiment of the present invention is best shown in FIGS. 6a and 6b. The dispenser assembly 70 includes a cap portion 72 having a configuration that is threadably coupled to the lower end 52 of the valve assembly 44. More particularly, the cap portion 72 includes a threaded interior section 74 that is complementary to the threaded exterior lower end 52 of the valve assembly 44. In operation, the dispenser assembly 70 may be coupled to the valve assembly 44 and selectively rotated (i.e. threadably engaged) to move closer to the valve assembly 44 or away from the valve assembly 44 depending upon the direction of rotation. The cap portion 72 defines at least one aperture 76 through which liquid received from the valve assembly 44 may flow.

An actuation button 78 is mounted atop the dispenser assembly cap portion 70 and is configured to bear against the valve assembly actuation plate 62 when the dispenser assembly 70 is engaged with the valve assembly 44. More particularly, the actuation button 78 forces the sealing mechanism 58 upwardly as the dispenser assembly 70 is threaded onto the valve assembly 44, this upward movement causing the sealing mechanism 58 to move to the open configuration so as to allow liquid from the reservoir 32 to flow through the valve assembly 44 and through the cap portion aperture(s) 76.

The dispenser assembly 70 also includes an application portion 77 connected to the cap portion 72 that is configured to receive the liquid from the reservoir (in the manner described above) and to apply that liquid to weeds. In the embodiment shown in FIGS. 1 to 6b, the application portion 77 includes a sponge pad 79 mounted downwardly adjacent to the cap portion 72. In this construction, liquid flowing through the cap portion 72 is deposited on and absorbed by the sponge pad 79 for application to a weed. The dispenser assembly 70 may also include a protective cap 71 that may be removably coupled to the application portion 77.

Figures 7A, 7B:
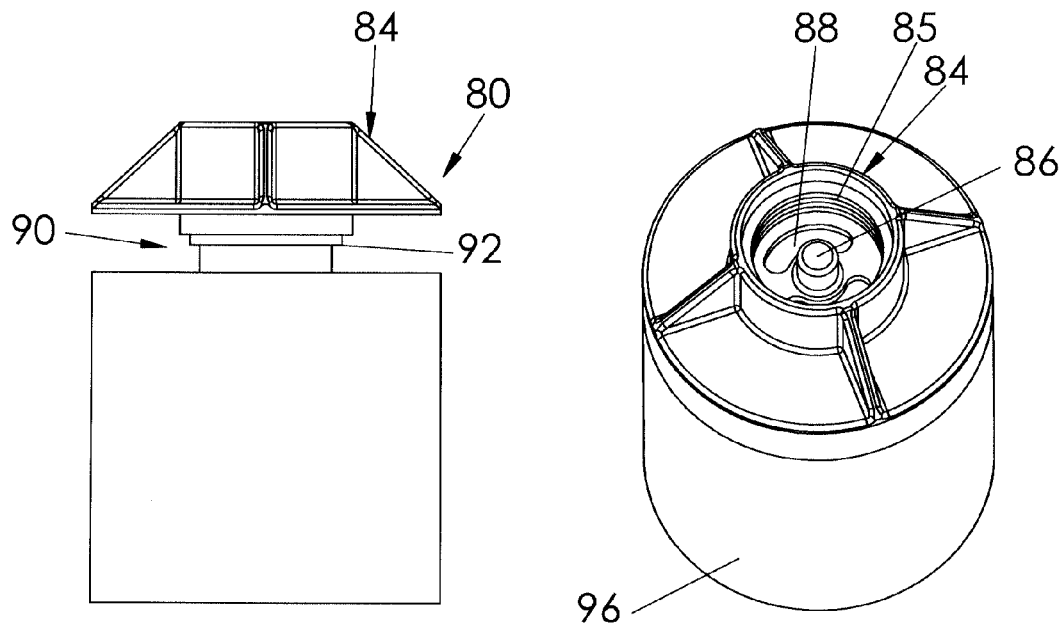
FIG. 7a is a side view of a first auxiliary dispenser assembly.
FIG. 7b is a perspective view of the first auxiliary dispenser assembly.
Figure 7C:
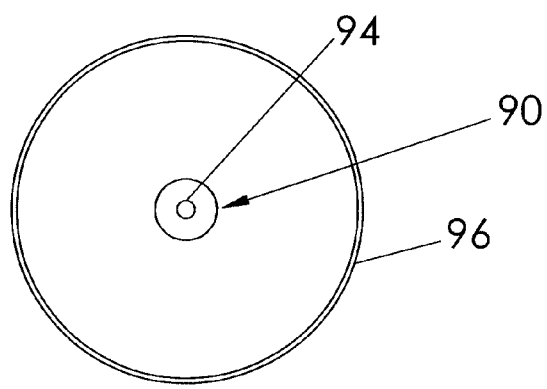
FIG. 7c is a bottom view of the first auxiliary dispenser assembly.
Figures 8A, 8B:
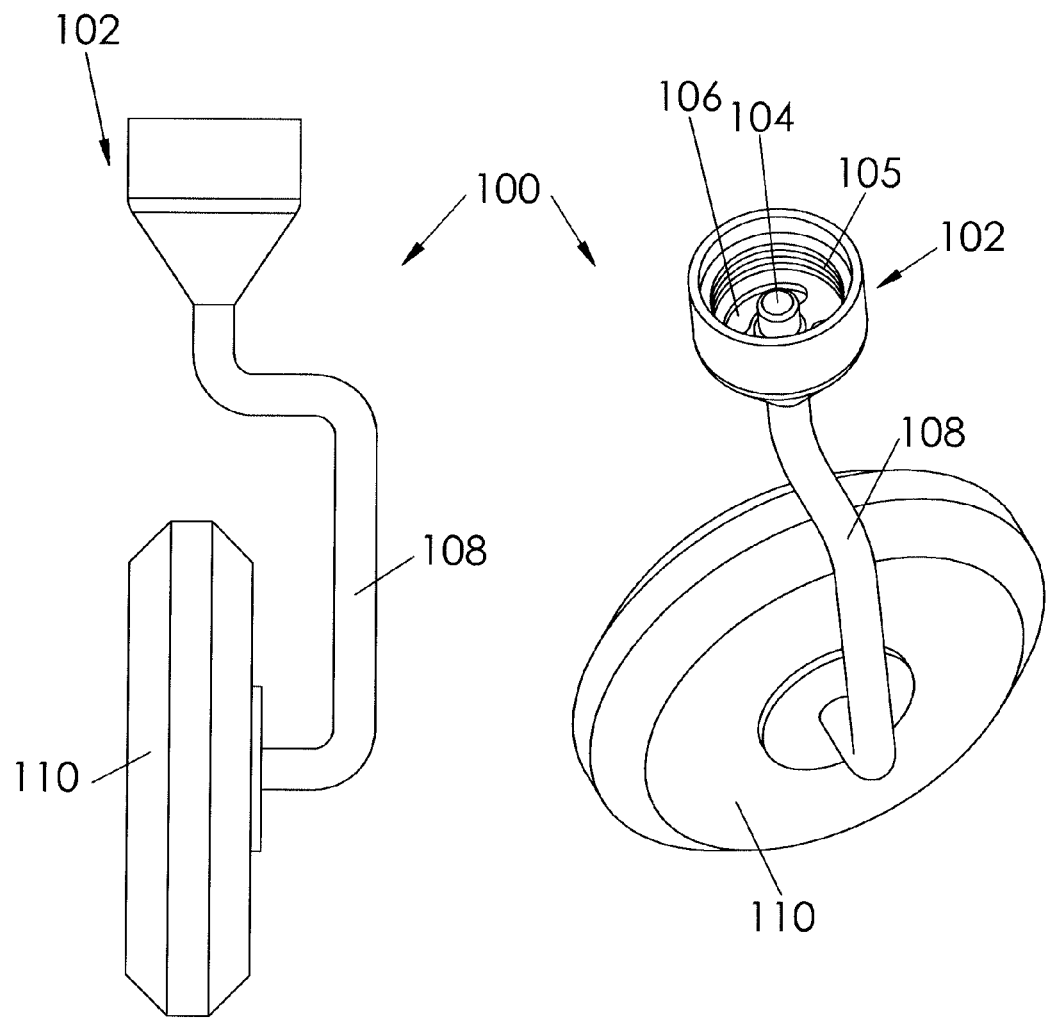
FIG. 8a is a front view of a second auxiliary dispenser assembly.
FIG. 8b is a perspective view of a second auxiliary dispenser assembly.

The dispenser assembly 70 described above is removable from the valve assembly 44 and may be replaced by a first auxiliary dispenser assembly 80 (FIGS. 7a to 7c). The first auxiliary dispenser assembly 80 includes a first auxiliary cap portion 84 also having a threaded configuration 85, a first auxiliary actuation button 86, and at least one first auxiliary aperture 88, each having a configuration substantially similar to respective structures described above. The first auxiliary dispenser assembly 80 also includes a first auxiliary application portion 90. The first auxiliary application portion 90, however, includes a pump activation valve 92 attached to the first auxiliary cap portion 84 that is in fluid communication with a spray nozzle 94. The first auxiliary dispenser assembly 80 may also include a spray shield 96 that extends downwardly of the pump activation valve 92 and has a diameter larger than that of the spray nozzle 94 so as to focus spraying of the liquid herbicide onto a desired weed and to prevent overspray.

The present invention may also include a second auxiliary dispenser assembly 100 that is substantially similar to the dispenser assembly first described except as specifically described below. The second auxiliary dispenser assembly 100 includes a second auxiliary cap portion 102 also having a threaded configuration 105, a second auxiliary actuation button 104, and at least one second auxiliary aperture 106, each having a configuration substantially similar to respective structures described above. The second auxiliary dispenser assembly 100 also includes a fluid transfer tube 108 extending downwardly from said second auxiliary aperture 106 to a second auxiliary applicator pad 110. The second auxiliary applicator pad 110 is preferably constructed of an absorbent sponge material that includes a configuration of a wheel or roller. In operation, liquid from the reservoir 32 is able to flow through the valve assembly 44 when the sealing mechanism 58 is at the open configuration and through the dispenser assembly cap portion aperture(s), through the liquid transfer tube 108 to the spongy application pad 79. The roller-shaped sponge pad 110 is axially coupled to a distal end of the transfer tube 108 and is rotatable so as to be driven across targeted weeds.

In use, the liquid herbicide applicator 10 may be prepared for operation. Specifically, the length adjustable handle member 12 may be adjusted between a plurality of length positions by moving the handle second portion 22 relative to the handle first portion 14. In fact, the handle member 12 may be entirely removed from the reservoir 32 if the user prefers to hold the reservoir 32 directly in use. Next, the reservoir 32 may be filled with a liquid, such as a liquid herbicide, by removing the inlet cap 40 and inserting the liquid through the inlet 38. The valve assembly 44 is normally closed as described above until a user manually moves the sealing mechanism 58 to an open configuration. A user may rotatably tighten the cap portion 72 of the dispenser assembly 70 to the valve assembly 44 which provides upward pressure against the actuation plate 62 and causes the sealing mechanism 58 to move to the open configuration. Liquid is then allowed to flow from the reservoir 32 through the valve assembly 44 and into the dispenser assembly 70. Liquid may further flow through the cap portion apertures 76 to the applicator portion 77 from which the herbicide may be applied to a weed as described above.

It is understood that while certain forms of this invention have been illustrated and described, it is not limited thereto except insofar as such limitations are included in the following claims and allowable functional equivalents thereof.

The invention claimed is:

1. A liquid herbicide applicator for dispensing a liquid herbicide to kill weeds on contact, comprising:
   a length adjustable handle member;
   a reservoir configured to store the liquid removably coupled to said handle member, said reservoir defining an inlet through which the liquid is selectively inserted and an outlet through which the liquid is selectively withdrawn;
   a valve assembly coupled to said reservoir outlet and operative between an open configuration that allows the liquid to flow through said outlet and a closed configuration that prevents the liquid from flowing through said outlet;
   wherein said valve assembly is biased toward said closed configuration;
   a dispenser assembly having a cap portion operatively coupled to said valve assembly and an application portion connected to said cap portion, said cap portion being selectively movable closer to said valve assembly such that said valve assembly is urged toward said open configuration and selectively movable away from said valve assembly such that said valve assembly is urged toward said closed configuration;
   wherein said liquid is communicated from said valve assembly to said dispenser assembly application portion when said valve assembly is at said open configuration;
   wherein said valve assembly includes:
      a valve assembly upper end attached to a lower end of said reservoir, said valve assembly upper end defining an opening in fluid communication with said reservoir outlet;
      a valve assembly lower end that defines an opening, said valve assembly defining a bore extending between said valve assembly upper and lower openings;
      a seal that is movable between said valve assembly closed configuration in which said seal blocks said liquid from passing through said bore and said valve assembly open configuration in which said seal does not block said liquid from passing through said bore;
      an actuation plate connected to said seal that selectively moves said seal between said valve assembly closed and open configurations when upward pressure is applied against said actuation plate;
      a spring positioned between said seal and said actuation plate for biasing said seal toward said closed configuration;
   wherein said dispenser assembly cap portion includes:
      an actuation button positioned to bear against and apply upward pressure to said actuation plate when said cap portion is selectively moved closer to said cap assembly;
      at least one aperture through which said liquid flows from said reservoir to said application portion of said dispenser assembly;
   wherein:
      an outer surface of said valve assembly lower end includes a threaded configuration; and
      said cap portion of said dispenser assembly is threadably coupled to said valve assembly lower end such that operation of said cap portion moves said dispenser assembly one of closer to or away from said valve assembly, respectively, whereby threaded operation of said cap portion operatively moves said valve assembly between said open and closed configurations.

2. The applicator as in claim 1, wherein said handle member includes:
   a first portion having opposed lower and upper ends;
   a second portion having opposed proximal and distal ends, said second portion being slidably movable relative to said first portion so as to adjust a length of said length adjustable handle; and
   a locking mechanism for maintaining said second portion at a selected configuration relative to said first portion.

3. The applicator as in claim 2, wherein said locking mechanism includes:
   a button on said handle first portion that is biased to extend outwardly; and
   wherein said handle second portion defines a plurality of apertures, each aperture having a configuration to receive said button therein in a releasable locking arrangement.

4. The applicator as in claim 2, further comprising a handle grip coupled to a distal end of said second portion of said handle.

5. The applicator as in claim 1, wherein said application portion of said dispenser assembly includes a sponge pad coupled to said cap portion of said dispenser assembly, said application portion being downwardly adjacent to said cap portion.

* * * * *